United States Patent
Ondrasik

[15] 3,703,946
[45] Nov. 28, 1972

[54] ANTI-SKID BRAKE SYSTEM
[72] Inventor: Robert Ondrasik, Elmhurst, N.Y.
[73] Assignee: Patents & Technolohy Exclusives, Inc., New York, N.Y.
[22] Filed: May 1, 1970
[21] Appl. No.: 33,661

[52] U.S. Cl............188/181 R, 303/21 CF, 303/21 F, 303/61, 310/168, 317/5
[51] Int. Cl................................................B60t 8/08
[58] Field of Search............188/181; 303/20, 21, 61; 307/120; 317/5; 324/160, 161; 340/52, 262; 200/61.45, 61.46; 310/168

[56] References Cited
UNITED STATES PATENTS

| | | | |
|---|---|---|---|
| 3,231,315 | 1/1966 | Turnbull | 303/21 F |
| 3,563,611 | 2/1971 | Sharp | 303/20 X |
| 3,017,145 | 1/1962 | Yarber | 303/21 P |
| 3,456,989 | 7/1969 | Stevens | 303/21 CF |
| 3,480,335 | 11/1969 | Inada | 303/21 F |

Primary Examiner—Milton Buchler
Assistant Examiner—Stephen G. Kunin
Attorney—Walter Kruger

[57] ABSTRACT

An anti-skid braking system of economical construction in which a sensing device in the form of a switch includes a magnetic actuator responsive to either teeth on a rotor or the vanes of a disc brake to intermittently operate the switch in response to wheel rotation of a vehicle equipped with the system. The switch is connected to a device for pulsing the brake system at the rate of operation of the switch. The system is so arranged that it operates to pulse the brake system only when the brake pedal is depressed and the speed of rotation of a wheel is less than 5 miles an hour. At higher speeds the system is inactive.

14 Claims, 8 Drawing Figures

INVENTOR
ROBERT ONDRASIK

BY ROYLANCE, ABRAMS,
KRUGER, BERDO & KAUL
ATTORNEYS

ANTI-SKID BRAKE SYSTEM

This invention relates to an anti-skid brake system which, because of its manner of operation, may aptly be termed a magnetic stop-pilot.

More particularly, the invention relates to an effective, yet inexpensive anti-skid system which prevents locking of the brakes of a vehicle to enable the operator to bring the vehicle to a rapid controlled stop without any conscious effort on the part of the operator other than applying the brakes in the usual manner.

As is well known, in the case of automobile or other road vehicle, maximum deceleration of the vehicle can be obtained if the vehicle brake is so applied that each wheel is decelerated to the maximum extent possible while allowing the wheel to roll on the road surface without skidding. The stopping distance of a vehicle on a dry concrete surface when the brakes are applied so there is skidding only slightly greater than the stopping distance where there is no skidding. However, the operator maintains better control of the vehicle if all the wheels of the vehicle continue to rotate, as occurs in the no-skid type braking. However, that statement assumes perfect braking conditions. Under poor driving conditions, such as wet highways, as well as icy highways, applying the brakes usually results in the locking of one or more wheels of the vehicle without locking all the wheels of the vehicle. Since a substantially equal force is applied to the brake of each wheel, when the brakes are applied, those wheels which are on the slipperiest portions of the highway will lock, while the other wheels will continue to turn as a result of the torque exerted on the tires by the highway surface. Under these conditions, one wheel may lock while the other wheels do not lock, with the result that the automobile or other vehicle has such unequal braking on opposite sides of the vehicle that it begins to spin. In any event, when one or more wheels are locked by the brake against rotation, the operator has little if any control over the direction of travel of the vehicle. This is especially true when the vehicle is rounding a curve when the brakes are applied in a "panic manner," since the centrifugal force of the vehicle rounding the curve tends to cause a skidding vehicle to skid toward the outside of the curve.

While many anti-skid anti-skid systems which prevent locking of the brakes of a vehicle are known, these systems are either ineffective or are quite expensive.

In accordance with this invention, it has been discovered that an anti-skid system which automatically and intermittently reduces and increases the braking pressure in response to a slow speed of rotation of one or all the wheels of the vehicle provides for excellent anti-skid operation. Where the systems in the past have used complex inertia responsive devices to sense a locked wheel condition so the pressure to the brake of the locked wheel is reduced, the system of this invention relies solely on a relatively slow speed of rotation of one or more wheels to actuate the device for intermittently reducing the braking pressure to the wheels. The ultimate effect obtained is the same as very rapid pumping of the brake pedal by the operator. By virtue of this automatic pumping action, a wheel which is locked or almost locked when the vehicle is traveling at high speed and the brakes are applied will have its brake intermittently released automatically until the speed of the wheel increases as a result of the torque acting on the tire from friction between the tire and the road surface. What occurs is that the intermittent reduction in braking pressure permits the road surface to accelerate a locked wheel as a result of momentum and speed of the vehicle so each wheel will exhibit a rolling action relative to the road surface rather than a sliding action which is dangerous and results in an uncontrolled skid.

In accordance with one feature of this invention, the brake system is so arranged that the anti-skid portion remains in an inactive condition except when the brakes are applied so there is no unnecessary wear or deterioration of the system.

In accordance with another aspect of this invention, a sensing device in the form of a switch assembly is secured to the vehicle adjacent a rotating element, such as the brake drum or brake disc of a wheel, and the switch is operated intermittently by alternate magnetic material portions of the rotating element. In this arrangement, the switch is directly connected to an electro-magnetic actuator of a device which pulses the brake system and takes the form of a piston communicating with the brake system. Each time the switch is actuated, the piston is retracted, thereby increasing the volume of the brake system, and as a result, pressure to the brakes is momentarily released. As soon as the switch opens, the piston is released and decreases the volume of the brake system. Rapid operation of the switch causes rapid pulsation of the brake system which allows the wheels to accelerate even though the brake is initially applied with sufficient force to lock the wheels. A distinct advantage of this system is that the brake system is pulsed as a sole result of magnetic material portions of the rotating element actuating the switch and correspondingly, no expensive separate pulsator is required.

Correspondingly, an object of this invention is an inexpensive anti-skid system for the brakes of a wheeled vehicle.

Another object is an anti-skid system which is sufficiently inexpensive that it can readily be included in all automobiles manufactured today and can also be added to the brake systems of existing vehicles.

Another object is a reliable anti-skid brake system which automatically pulses the system to provide a pumping effect which intermittently releases the brake of any particular wheel whenever the speed of rotation of the wheel is below a predetermined value.

Another object is an anti-skid brake system in which the rate of pulsation of the brake system is attained as a sole result of the operation of a switch which senses spaced apart magnetic material portions of an element rotating with the movable portion of the brakes of the vehicle.

A still further object is anti-skid brake system including an inexpensive magnetic actuator which actuates the switch intermittently in response to travel of the spaced apart portions of magnetic material of a rotating element along a path adjacent the actuator.

A still further object is an arrangement with two switches and magnetic material portions on the rotating element of the brake arranged in such a manner that at least one switch is always actuated regardless of the rotational position of the wheel relative to the switches, even when the wheel is initially locked by applying the brake, but only when the wheel rotates below a predetermined speed.

Numerous other objects, advantages, and features of this invention will become apparent with reference to the drawings, which form a part of this specification, and in which:

FIGS. 3A, 3B and 3C are diagrammatic views showing the operation of the sensing device of this invention in response to wheel rotation with:

Figures 3A, 3B, 3C:
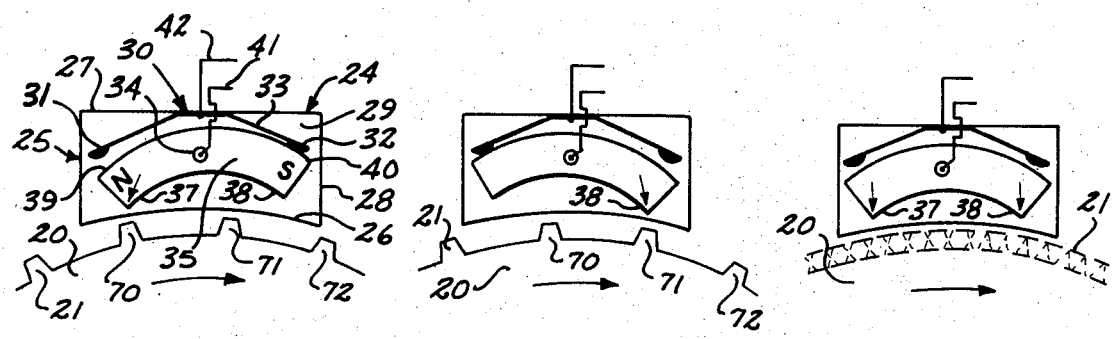
Figures 4, 5:
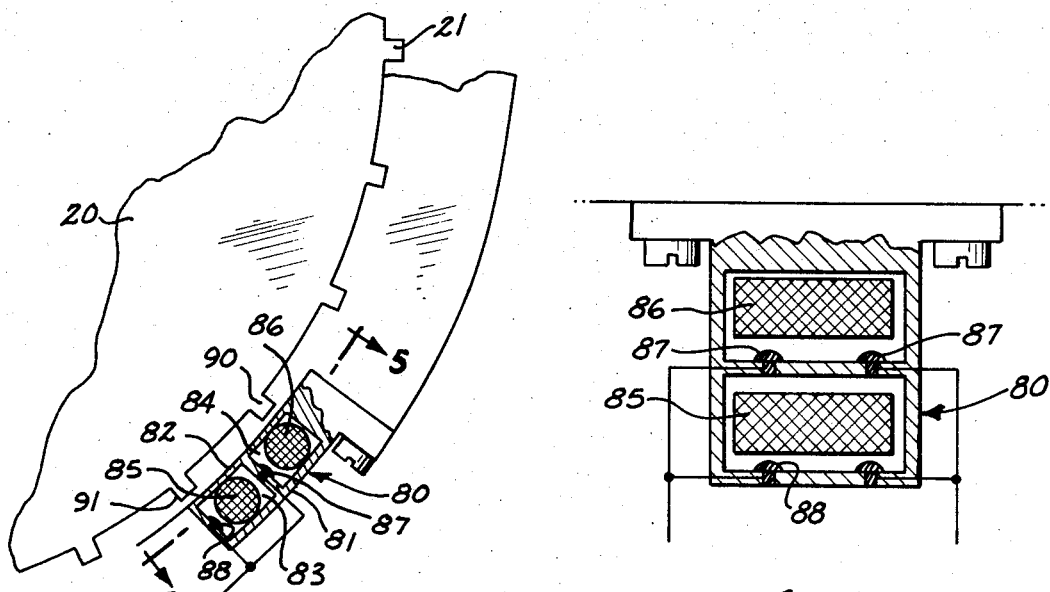

FIG. 3A showing the switching actuator pivoted in one direction so one switch is closed, FIG. 3B showing the actuator pivoted in the opposite direction so the other switch is closed, and FIG. 3C showing the actuator in a balanced position with neither switch closed when the rotating element rotates rapidly;

FIG. 4 is a diagrammatic view of a second embodiment of the sensing device of this invention where the sensing device includes two separate switches;

FIG. 5 is a partial view in section taken along line 5—5 of FIG. 4; and

Figure 6:
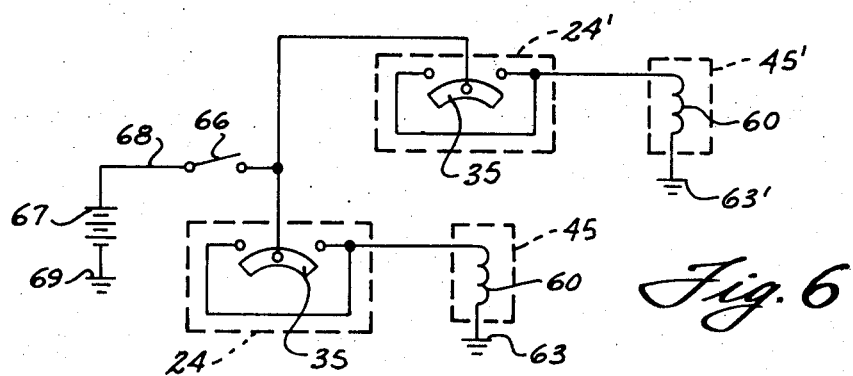

FIG. 6 is a schematic of the wiring of the anti-skid system.

Figure 1:
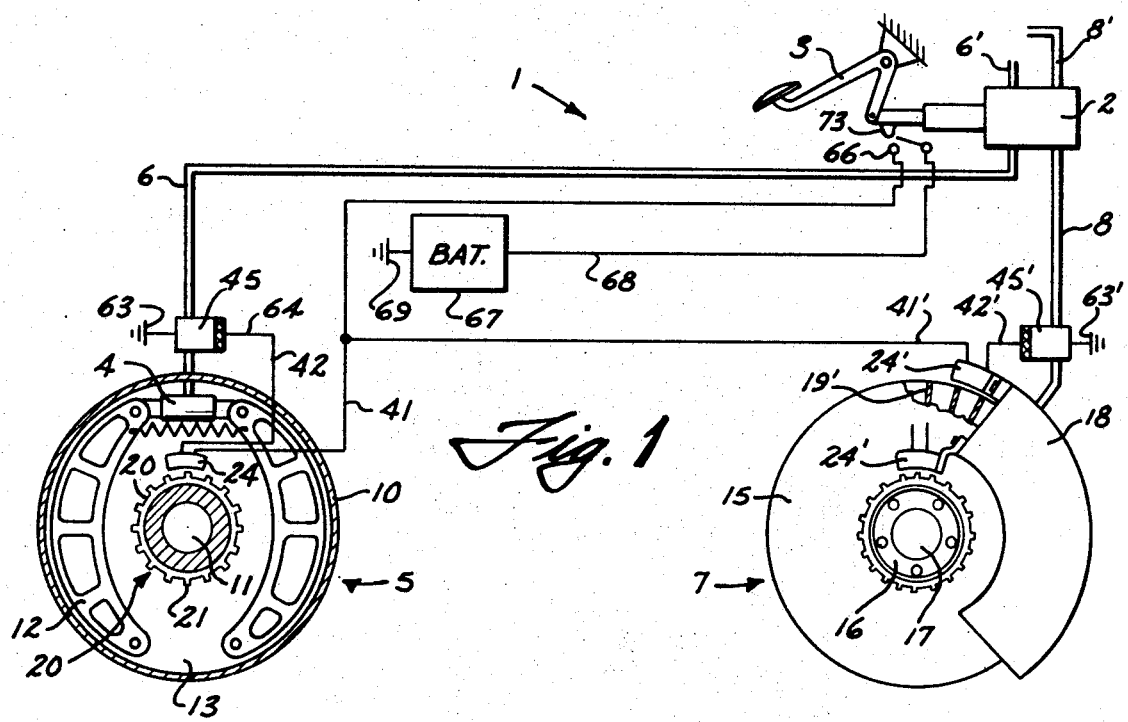
FIG. 1 is a schematic showing the anti-skid system of this invention as used with a conventional hydraulic brake system of the type including a drum brake and a disc brake.

Referring now the the drawings in detail and particularly to FIG. 1, there is shown a hydraulic brake system 1 including a master cylinder 2 operated by the usual brake pedal 3. As is now required by government safety standards, the mater cylinder is of the dual type in which the hydraulic system for operating the rear wheel brakes is separate from the hydraulic system for the front wheel brakes so at least some braking is available in case one of the systems fails. Master cylinder 2 is connected to the wheel cylinder 4 of the rear wheel brake assembly 5 by a hydraulic line 6. Master cylinder 2 is also connected to the operating cylinder (not shown) of front wheel disc brake assembly 7 via a hydraulic line 8. While FIG. 1 shows only the front and rear brake assemblies at one side of the vehicle, it is to be understood that there is a rear brake assembly at the other side of the vehicle like rear brake assembly 5 and which is connected to hydraulic line 6' which communicates with hydraulic line 6 at the master cylinder, and there is a front brake assembly like brake assembly 7 which is connected hydraulic line 8' which communicates with the hydraulic line 8 at the master cylinder.

Rear wheel brake assembly 5 includes the usual brake drum 10 which is secured to the rear wheel axle 11 and rotates with the axle. Within brake drum 10 are a pair of brake shoes 12 carried by the usual backing plate 13 which is secured to the axle housing (not shown) of the rear wheels in the usual manner. The brake assembly 5 operates in the conventional manner in that pressure in line 6 expands shoes 12 into engagement with the inside surface of drum 10 to brake the drum, and the rear wheel of the vehicle which is secured to the drum.

Disc brake assembly 7 includes a rotating disc 15 which is secured to a hub 16 which in turn is secured to a front wheel of the vehicle. Disc 15 and hub 16 are journalled for rotation about the stationary spindle 17 of the front wheel assembly. Disc brake assembly 7 also includes the usual actuator housing 18 which is secured against rotation relative to a spindle 17. As shown at FIG. 1, disc 15 is of the conventional type having a hollow interior with a plurality of vanes 19' extending radially of disc 15 in equal circumferentially spaced relation to each other around the disc. The vanes 19' operate in the manner of centrifugal compressor to force air through the disc from an inner location adjacent spindle 16 to the outer circumference of the disc. This air functions to cool the disc and correspondingly vanes 19' may be referred to as cooling fins. At least vanes 19' of disc 15 are formed from magnetic material such as steel, and function as the operating means for the sensing device at front wheel assembly 7.

Mounted on the rear wheel assembly and secured to axle 11 for rotation therewith is an operating element in the form of a cylindrical rotor 20. Rotor 20 includes a plurality of radially outwardly extending teeth 21 which are equally spaced from each other circumferentially of the rotor. Advantageously, each of teeth 21 is elongated in a direction axially of axle 11, and at least teeth 21 of rotor 20 are formed from magnetic material.

Secured to backing plate 13 is a sensing device 24 having a housing 25 which, as shown at FIG. 3A, is mounted closely adjacent the path of travel of teeth 21 of rotor 20. Housing 25 is formed from a rigid nonmagnetic material, for example, a plastic such as polystyrene or polyethylene, or alternatively, a nonmagnetic metal such as aluminum or copper. As shown at FIG. 3, housing 25 has an arcuately curved inner wall 26, a top wall 27, end walls 28, and side walls 29.

In the preferred embodiment described herein, housing 25 is formed from plastic material with good electrical insulating properties such as polystyrene, and a contact assembly 30 is secured to top wall 27 of the housing. Contact assembly 30 includes contacts 31 and 32 mounted on the ends of spring arms 33 which extend downwardly from the top wall 27 at an acute angle from the center of the top wall where the contact assembly is secured to the housing. Mounted at the center of the housing and supported by side walls 29 is a transversely extending pivot shaft 34 which is parallel to the axis of rotation of rotor 20. Pivotally mounted on pivot 34 is a switch actuator 35 in the form of an elongated arm having a central opening 36 through which pivot 34 extends. Advantageously, actuator 35 is pivoted precisely at its center of gravity, so it is balanced and shock and vibration as a result of wheel movement and impact will not cause the arm to pivot.

Actuator 35 includes ends 37 and 38 at opposite sides of the pivot which extend toward rotor 20. The actuator is a permanent magnet formed from electrically conducting magnet material. With the actuator formed of an electrically conducting material, upper surfaces 39 and 40 at opposite sides of the actuator provide contacts for engagement respectively with the contacts 31 and 32, depending on the position of the actuator. Electrically connected to actuator 35 is a wire 41 and electrically connected to contact assembly 30 is a wire 42. Advantageously, sensing device 24 is so mounted on backing plate 13 that the axis of pivotal movement of actuator 24 is in the same vertical plane as the axis of rotation of rotor 20.

Secured to housing 18 of front wheel assembly 7 is a sensing device 24' identical in construction to sensing device 24 save that the arrangement for securing sensing device 24' to housing 18 is different. Wires 41' and 42' are connected to the contact assembly and actuator of sensing device 24'.

Connected in hydraulic line 6 is an electromagnetically operated pulsing device 45 in the form of a pump which, when actuated, functions to intermittently pulse the hydraulic fluid in the system including the line 6 so the pressure in the line and the wheel cylinder is alternately reduced and increased. A similar pulsing device 45' is connected in line 8 which extends to front wheel assembly 7.

Figure 2:
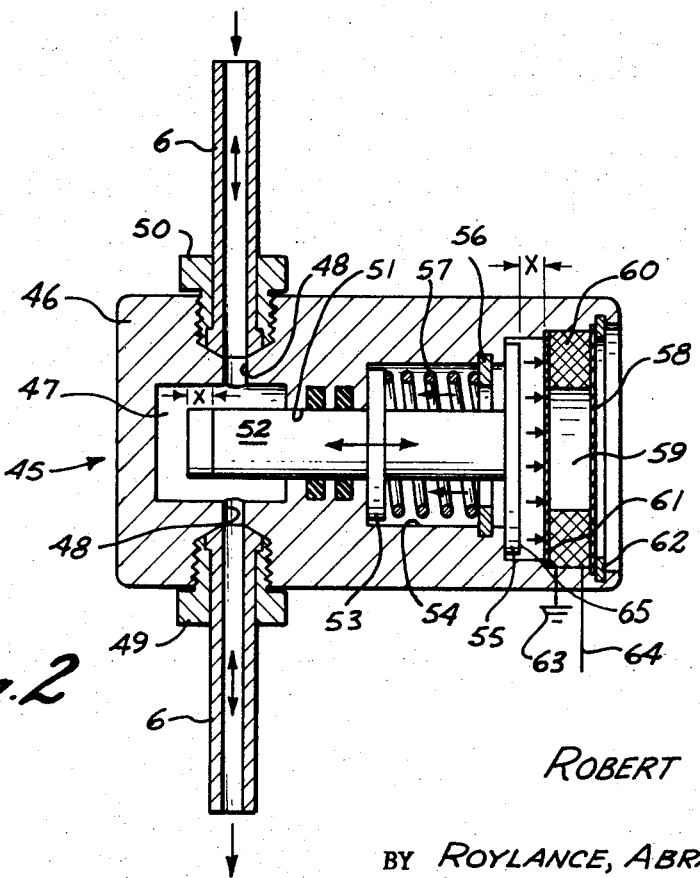
FIG. 2 is an enlarged view end section of the electromagnetic pump for pulsing the brake system of FIG. 1.

FIG. 2 shows the details of pulsing device 45. As shown, the device includes a body 46 which is generally cylindrical and has a chamber 47 formed therein. Communicating with chamber 47 are ports 48 which in turn communicate with line 6 which is secured to the ports 48 by the respective threaded connectors 49 and 50. Extending into chamber 47 through a packed bore 51 is a cylindrical piston 52 of uniform diameter. A collar 53 fixed to the piston is located in a large diameter bore 54 spaced from chamber 47. Secured to the end of piston 52 is disc 55 of magnetic material.

Mounted in a groove near the outer end of bore 54 is a snap ring 56. A helically coiled compression spring 57 is mounted on piston 52 with one of its end seated on collar 53 and the other end seated on the inwardly facing surface of snap ring 56. Advantageously, collar 55 is arranged to be threaded onto the end of piston 52 to facilitate assembly of the pulsing device.

An electromagnet 58 including a core 59 and a coil 60 are mounted in a counter bored opening 61 at the end of the housing remote from chamber 47. Core 59 and coil 60 are held in place by a snap ring 62 seated in a groove adjacent the outer end of counterbore 61. One end of coil 60 is grounded to body 46, as at 63, and the other end of coil 60 is connected to an insulated wire 64 which extends from the body. Whenever coil 60 is energized, disc 55 and correspondingly piston 52 move the distance X, shown at FIG. 2, so end face 65 of the disc engages the inside face of electromagnet 58. Such movement of the piston is in opposition to the force exerted by spring 57 and, hence, when coiled 60 is deenergized, piston 52 is immediately returned to the position of FIG. 2. Collar 53 cooperates with an end face of bore 54 to limit the direction of movement of the piston into chamber 47. It will be apparent with reference to FIG. 2 that whenever electromagnet 58 is energized and piston 52 is retracted, the volume of chamber 47 is increased and, correspondingly, the pressure in both chamber 47 and that portion of the brake system communicating with chamber 47 is momentarily reduced. Correspondingly, when electromagnet 58 is deenergized, the piston is moved back into chamber 47 and the pressure in the chamber and communicating brake system momentarily increases.

The manner in which pulsing device 45 is electrically connected to actuator 24 and the manner in which pulsing device 45' is electrically connected to sensing device 24' is shown at FIGS. 1 and 6. As shown at FIG. 1, the body 46 of pulsing device 45 is grounded to the frame of the vehicle as at 63. Wire 64 is connected to wire 42 of sensing device 24, and the other wire 41 is connected to a switch 66 associated with brake pedal 3 and arranged to be closed each time the brake pedal is depressed. Battery 67 of the vehicle is connected to switch 66 by wire 68 and the other terminal of the battery is grounded to the vehicle frame as at 69.

Similarly, pulsing device 45' is grounded to the vehicle frame as at 63' and is connected to sensing device 24' by wire 42'. Wire 41' of sensing device 24' is connected to wire 41.

FIG. 6 shows the arrangement schematically. As shown, battery 67 is connected in series with switch 66. Sensing device 24 and coil 60 are in turn in series with each other as well as with the battery and switch 66. In addition, sensing device 24' and coil 60' are in series with each other as well as with battery 67 and switch 66. This arrangement provides for actuating pulsing device 45 for the rear wheels whenever sensing device 24 is operated and switch 66 is closed, and operating pulsing device 45' whenever sensing device 24' is actuated and switch 66 is closed. As is apparent, the operation of pulsing device 45 for the rear wheels is completely independent of pulsing device 45' for the front wheels of the vehicle.

OPERATION OF FIRST EMBODIMENT

The manner of operation of the first embodiment of the anti-skid system of this invention will now be explained. First, however, the operation of actuator 24 will be described. With reference to FIG. 3A, it will be seen that rotor 20 as well as the rear wheel and brake drum 10 rotate in a clockwise direction when the vehicle is moving forwardly. To facilitate explanation, several teeth of the rotor are designated 70–72. When tooth 70 moves to a position opposite end 37 of actuator 35, the actuator pivots in a counterclockwise direction so contact surface 40 of the actuator engages contact 32. Likewise, as shown at FIG. 3B, when a tooth 71 moves to a position opposite end 38 of actuator 35, the actuator pivots in a clockwise direction so contact surface 39 engages contact 31. However, this only occurs when rotor 20 is rotating at a relatively slow speed of rotation. When rotor 20 is rotating at high speed, as when the vehicle is travelling at a speed above about 5 miles an hour, the teeth of the rotor travel by ends 37 and 38 of actuator 35 at such a rapid rate that the actuator never pivots to either position in which the contacts are closed. This occurs because the inertia of actuator 35 is sufficiently great that by the time the actuator tends to pivot in one direction as a result of an approaching tooth of the rotor, another tooth of the rotor is approaching the other end of the actuator, and hence, the actuator never pivots a sufficient distance in either direction to close the contacts. However, when the rotor 20 and wheel with which it rotates is rotating at a relatively slow speed, for example, when the vehicle is travelling at less than 5 miles an hour, actuator 35 will first pivot in one direction when a tooth 70 is in the position shown at FIG. 3A and will next pivot in the other direction when a tooth is in the position of tooth 72 of FIG. 3B.

It will be observed with reference to FIGS. 3A and 3B that the distance between the teeth on the rotor is approximately two-thirds the distance between inwardly extending ends 37 and 38 of actuator 35. This arrangement assures rapid opening and closing of the contacts even if the rotor turns quite slowly. In addition, a tooth will be closely adjacent either end 37 or end 38 of the actuator even if the rotor is stopped, as can occur when the brakes are applied hard and a wheel is effectively locked. As a practical matter, however, even though a wheel of the vehicle is locked by "jamming on" the brakes, the inertia of the brake drum or brake disc and wheel cannot be overcome instantaneously. Hence, rotor 20 will rotate a slight amount, sufficient for at least one of the teeth, for example tooth 70, to move to a position opposite end 37 of actuator 35 as shown at FIG. 3A. When this occurs, the actuator pivots so the circuit through the actuator is completed, and since brake pedal 3 is depressed, switch 62 is closed and therefore coil 60 is energized to actuate the pulsing device. With coil 60 energized, piston 52 is withdrawn from chamber 47 and the pressure in the portion of the brake system which communicates with pulsing device 45 is momentarily reduced. Since the pressure in a hydraulic system is the same throughout the system, the pressure on the brake shoe or other non-rotating element of the brake is also momentarily reduced with the result that the rotating element of the brake is free to rotate momentarily. Such rotation, however, causes a tooth, for example tooth 71, to move to a position adjacent the end 38 of the actuator so the actuator switch is momentarily opened and then immediately closed in the opposite direction. Hence, piston 52 is released and spring 57 forces the piston back into chamber 47, but only momentarily because as soon as the actuator 35 closes the switch in the opposite direction, electromagnet 58 is again energized to withdraw piston 52 from the chamber. As a result, piston 52 is rapidly oscillated back and forth in chamber 47 in the manner of a pump piston and correspondingly the pressure in the brake system is pulsating pressure of the same effect as pumping the brake pedal of the vehicle. This rapid pulsation permits a locked wheel to regain rotation.

With reference to FIG. 6, it will be seen that electricity from battery 67 is available to operate pulsing devices 45 and 45' only when brake pedal 3 is depressed so switch 66 is closed. When the brake pedal 3 is not depressed, switch 66 is open, and even though actuators 35 pivot to and fro to the several positions of FIG. 3, pulsing device 45 is not operated. While switch 66 is shown at FIG. 1 to be a mechanically operated switch which is closed by ear 73 when brake pedal 3 is depressed, the switch can be a pressure operated switch such as the usual brake light switch connected to one of the brake lines and which is operated in response to an increase in pressure in the system.

It must be understood that if the vehicle is travelling on a smooth dry surface and the brake pedal is applied in such a manner that none of the wheels is decelerated to a speed below about 5 miles an hour for the vehicle, sensing device 24 is not actuated since actuator 35 remains in the balanced position of FIG. 3C. However, if any wheel should become locked, perhaps as a result of a change of the coefficient of friction between the road surface and the tire, the actuator 35 is immediately actuated and pivoted in the manner explained, whereupon pulsing of the portion of the brake system for the locked wheel occurs. As a result of this pulsing, the brake of the locked wheel is automatically applied and released at a frequency proportional to the speed of rotation of rotor 20, so long as the rotor speed is below a predetermined value. When the vehicle is travelling at a speed below about 5 miles an hour and the brakes are applied, the pulsing action occurs in the brake system for both the front and rear wheels. However, it has been found that such pulsing does not interfere with normal braking at low speeds, and does in fact prevent skids when the brakes are applied and the vehicle is travelling on an icy highway.

While the arrangement of FIGS. 3A-3C is for a rear wheel equipped with a rotor 20, it will be apparent with reference to FIG. 1 that the vanes 19 of magnetic material and which form a portion of the disc 15 of the front wheel brake perform the same function as the teeth 21 and 70-72 of rotor 20. Since disc brakes are standard equipment on many vehicles manufactured in the United States today, it is merely necessary to provide a sensing device 24' in which the actuator 35 has a length between its ends 37 and 38 equal to approximately one and one-half times the circumferential distance between the vanes 19. Then, a pulsing device 45' for each front wheel completes the system.

SECOND EMBODIMENT

A second embodiment of the sensing device of this invention is shown at FIGS. 4 and 5. Sensing device 80 includes a housing 81 formed from a rigid nonmagnetic material with good electrical insulating properties such as polystyrene. The housing has a curved inner wall 82 adjacent the path of travel of a rotor 20 with teeth 21. Alternatively, sensing device 80 could be mounted adjacent the periphery of a disc 15 having the spaced apart magnetic material vanes 19 shown at FIG. 1.

Housing 81 is divided into chambers 83 and 84. Located in chamber 83 is a bar magnet 85 and located in chamber 84 is a bar magnet 86. As shown at FIG. 4, magnets 85 and 86 are each cylindrical in cross section. These magnets are free to move within the chambers from the position for magnet 86 which is spaced from the contacts 87 to the position of magnet 85 which engages the contacts 88.

The operation of the embodiment of FIGS. 4 and 5 is quite like that described for the sensing device 24, previously described. With reference to FIG. 4, the approach of a tooth 90 causes magnet 86 to be lifted so it is out of engagement with contacts 87. However, because tooth 91 is in a position where it urges magnet 85 toward contacts 88, these contacts are bridged and a circuit is completed which actuates the pulsing device associated with sensing device 80. When rotor 20 is rotating at a relatively high speed, the teeth have the same effect on magnets 86 and 85 as a rotor with a smooth surface, and as a result, both magnets 85 and 86 are lifted away from the respective contacts. Advantageously, the magnets 85 and 86 are lifted away from the contact whenever the vehicle speed is above about 5 miles an hour. Should the vehicle speed decrease to below 5 miles an hour, magnets 85 and 86 are alternately lifted so contacts 87 and 88 are alternately closed and opened. However, unless the brake pedal is depressed so switch 66 is closed, such movement of the magnets has no effect on the pulsing devices 45 or 45'.

While the anti-skid system of this invention has been described for a vehicle with front wheel disc brakes and rear wheel drum brakes, with a pulsing device such as the pulsing device 45 or 45' associated with the brake system of each wheel of the vehicle, it is to be understood that in newer type vehicles which have a dual master cylinder where the front wheel brake system is isolated from the rear wheel brake system, it would be sufficient to use only one pulsator with the front wheel brake system and one pulsing device with the rear wheel brake system, including of course a separate sensing device for each wheel of the vehicle. It has been found, however, that better anti-skid operation is obtained if a separate pulsing device is used for each wheel of the vehicle, regardless of the type of hydraulic system, and the pulsing device is located in the brake line at a location closely adjacent the wheel cylinder or other brake actuating device of the particular wheel.

While several preferred embodiments of a sensing device which actuates a pulsing device at a frequency the same as the frequency of operation of the sensing device have been described herein, it is to be understood that numerous changes can be made in this system without departing from the scope of the invention as specified herein and defined in the appended claims. For example, additional circuitry could be used to operate the pulsing device at a frequency which is either a multiple of or a fraction of the frequency of operation of each sensing device. In addition, the pulsing device described herein is merely exemplary of a preferred embodiment and it is to be understood that the pulsing device could take the form of a valve which releases a small amount of fluid from the brake system and is arranged to return the released fluid to a non-pressurized portion of the system, such as the reservoir of the master cylinder.

What is claimed is:

1. An anti-skid brake system for a vehicle comprising, in combination
   a brake including a rotating assembly rotating in response to movement of the vehicle and a brake element cooperating with the assembly to selectively decelerate same;
   a sensing device adjacent said rotating assembly, said sensing device having an output;
   means on said rotating assembly to intermittently operate said sensing device at a rate proportional to the speed of rotation of the rotating assembly to produce a signal at said output at a frequency proportional to the speed of rotation of the rotating assembly;
   said sensing device including means responsive only to a speed of rotation of the rotating assembly below a predetermined value;
   and means to pulse the brake system at a rate proportional to said signal frequency at said output of said sensing device, whereby, the brake system is pulsed at a rate proportional to the speed of rotation of the rotating assembly;
   said sensing means being ineffective to pulse the brake system when the vehicle is at test and the rotating assembly is stationary.

2. A system according to claim 1 wherein said rotating assembly includes a brake drum; and said means on said rotating assembly is connected to the brake drum for rotation therewith.

3. A system according to claim 2 wherein said means on said rotating assembly includes
   spaced apart portions of a material to which said sensing means is responsive, said spaced apart portions moving with said brake drum along a predetermined path of travel; and
said sensing device is mounted adjacent the path of travel of said spaced apart portion.

4. A system according to claim 3 wherein
   said spaced apart portions are portions of magnetic material; and
   said sensing means includes switch means adjacent the path of travel of said magnetic material portions;
   one of said switch means and said magnetic material portions including a magnet.

5. A system according to claim 4 wherein said switch means includes said magnet.

6. A system according to claim 1 which further includes
   brake operating means to selectively energize said brake; and
   means responsive to energization of said brake to operate said means to pulse the brake system only when said brake is energized.

7. A system according to claim 1 wherein
   said brake system is of the hydraulic type; and
   said means to pulse the brake system is
      a pump element communicating with the system and alternately increasing and decreasing the pressure in said system at said proportional rate.

8. An anti-skid brake system for a vehicle comprising, in combination
   a brake including a rotating assembly rotating in response to movement of the vehicle and a brake element cooperating with the assembly to selectively decelerate same;
   a sensing device adjacent said rotating assembly
   means on said rotating assembly to intermittently operate said sensing device at a rate proportional to the speed of rotation of the rotating assembly;
   said sensing device including means responsive only to a speed of rotation below a predetermined value;
   means to pulse the brake system at a rate proportional to said rate of operation of said sensing device;
   said rotating assembly being the rotor of a disc type brake; and
   said means on rotating assembly including cooling fins of said rotor.

9. A system according to claim 8, wherein
   said fins are of magnetic material; and
   said sensing means includes
      switch means, and
      magnet means to operate said switch means in response to travel of a cooling fin adjacent said magnet means.

10. An anti-skid brake system for a vehicle comprising, in combination
    a brake assembly comprising
       a first brake element coupled to a wheel of the vehicle and rotating with the wheel, and a second brake element associated with the first brake element and energizable to brake said first element;
a sensing device including a switch;
actuating means rotating with said first brake element and intermittently actuating said switch at a frequency proportional to the speed of rotation of said first brake element, said actuating means comprising
a plurality of spaced apart portions of magnetic material
means mounting said switch adjacent the path of travel of said magnetic material portions;
said switch including a magnetic actuator responsive to movement of each of said magnetic material portions adjacent said actuator to actuate said switch only when the velocity of said magnetic material portions is below a predetermined value;
means to energize said second brake element; and
means to alternately increase and decrease the extent of energization of said second brake element at a frequency proportional to the frequency of actuation of said switch.

11. A system according to claim 10 wherein
said brake system is a hydraulic brake system including a pump to energize said second brake element by applying pressure on the brake element via a hydraulic line extending between the pump and brake element; and
said means to intermittently reduce the extent of energization of said second brake element includes
means communicating with said hydraulic line to intermittently reduce the hydraulic pressure in the line.

12. A system according to claim 11 wherein
said means communicating with said hydraulic line includes
a second pump having a movable operating member communicating with said hydraulic line, and
motor means to move said operating member in response to actuation of said switch means.

13. A system according to claim 12 wherein said motor means comprises
an armature connected to said operating member, and
an electromagnet to move said armature.

14. A system according to claim 10 wherein said switch means comprises
a first switch, and
a second switch; and actuating means including a magnet to actuate said switch means sequentially in response to travel of said magnetic material portions adjacent said armature means.

* * * * *